(12) United States Patent
Kimbrel et al.

(10) Patent No.: US 7,085,837 B2
(45) Date of Patent: Aug. 1, 2006

(54) DYNAMIC RESOURCE ALLOCATION USING KNOWN FUTURE BENEFITS

(75) Inventors: Tracy J. Kimbrel, Cortlandt Manor, NY (US); Robert Krauthgamer, Ramat Hasharon (IL); Baruch M. Schieber, White Plains, NY (US); Maxim I. Sviridenko, Mohegan Lake, NY (US); Jayram S. Thathachar, San Jose, CA (US); Maria Minkoff, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 10/000,320

(22) Filed: Dec. 4, 2001

(65) Prior Publication Data

US 2003/0105868 A1    Jun. 5, 2003

(51) Int. Cl.
*G06F 13/00* (2006.01)

(52) U.S. Cl. ............... 709/226; 709/201; 709/203; 709/217; 709/219; 709/227; 709/229; 705/8

(58) Field of Classification Search ............... 709/226, 709/203, 201, 217, 219, 227; 705/8
See application file for complete search history.

(56) References Cited

U.S. PATENT DOCUMENTS

| | | | | |
|---|---|---|---|---|
| 4,744,026 | A | * | 5/1988 | Vanderbei ............... 705/8 |
| 5,216,593 | A | * | 6/1993 | Dietrich et al. ........... 345/467 |
| 5,819,019 | A | * | 10/1998 | Nelson ..................... 714/4 |
| 6,260,068 | B1 | * | 7/2001 | Zalewski et al. ......... 709/226 |

(Continued)

OTHER PUBLICATIONS

Borodin, A., and El-Yaniv, R., "Online Computation and Competitive Analysis", pp. 123-127 and 150-151, (1998).

(Continued)

*Primary Examiner*—David Wiley
*Assistant Examiner*—Alina Boutah
(74) *Attorney, Agent, or Firm*—Whitham, Curtis, Christofferson & Cook, PC; Stephen C. Kaufman

(57) ABSTRACT

A benefit task system implements a policy for allocating resources to yield some benefit. The method implemented may be applied to a variety of problems, and the benefit may be either tangible (e.g., profit) or intangible (e.g., customer satisfaction). In one example, the method is applied to server allocation in a Web site server "farm" given full information regarding future loads to maximize profits for the Web hosting service provider. In another example, the method is applied to the allocation of telephone help in a way to improve customer satisfaction. In yet another example, the method is applied to distributed computing problem where the resources to be allocated are general purpose computers connected in a network and used to solve computationally intensive problems. Solution of the Web server "farm" problem is based on information regarding future loads to achieve close to the greatest possible revenue based on the assumption that revenue is proportional to the utilization of servers and differentiated by customer class. The method of server allocation uses an approach which reduces the Web server farm problem to a minimum-cost network flow problem, which can be solved in polynomial time. Similar solutions are applicable to other resource allocation problems.

8 Claims, 4 Drawing Sheets

U.S. PATENT DOCUMENTS

| | | | |
|---|---|---|---|
| 6,341,266 B1* | 1/2002 | Braun | 705/7 |
| 6,754,883 B1* | 6/2004 | DeBusk et al. | 717/107 |
| 6,901,446 B1* | 5/2005 | Chellis et al. | 709/226 |
| 2002/0116300 A1* | 8/2002 | DeBusk et al. | 705/29 |
| 2003/0037146 A1* | 2/2003 | O'Neill | 709/226 |

OTHER PUBLICATIONS

Ahuja, R. K., Magnanti, T. L., and Orlin, J. B., "Network Flows: Theory, Algorithms, and Applications", pp. 4-5 and 294-341, (1993).

* cited by examiner

DYNAMIC RESOURCE ALLOCATION USING KNOWN FUTURE BENEFITS

BACKGROUND OF THE INVENTION

1. Field of the Invention

The present invention generally relates to benefit task systems and, more particularly, to a policy for allocating resources to maximize some benefit. The invention may be applied to a variety of problems, and the benefit may be either tangible (e.g., profit) or intangible (e.g., customer satisfaction). In a specific example, the invention has particular application to server allocation in a Web site server "farm" given full information regarding future loads to maximize profits for the Web hosting service provider. In another specific example, the invention can be applied to the allocation of telephone help in a way to improve customer satisfaction. In yet another example, the invention may be applied to distributed computing problems where the resources to be allocated are general purpose computers connected in a network and used to solve computationally intensive problems.

2. Background Description

Web content hosting is an important emerging market. Data centers and Web server "farms" are proliferating. The rationale for using such centers is that service providers can benefit from economies of scale and sharing of resources among multiple customers. This benefit in turn translates to lower cost of maintenance for the customers who purchase these hosting services. Web content hosting services are structured in many ways. One of the most prevailing ways is outsourcing: the customers deliver their Web site content in response to HTTP (hyper text transfer protocol) requests. Service providers will use "farms" of commodity servers to achieve this goal.

One of the components in the payment for such a service is "pay per served request". Thus, one of the main objectives of the service provider is to maximize the revenue from served requests while keeping the tab on the amount of resources used. Ideally, the allocation to a Web site should always suffice to serve its requests. However, due to a limited number of servers and the overhead incurred in changing the allocation of a server from one site to another, the system may become overloaded, and requests may be left unserved. Under the assumption that requests are not queued, a request is lost if it is not served at the time it is requested. The problem faced by the Web hosting service provider is how to utilize the available servers in the most profitable way, given full information regarding future loads.

Similar considerations apply in the cases of computer servers and telephone support centers. Telephone support centers typically are computer controlled telephone networks having a number of technical support, order support and customer service support operators. These operators are resources that must be allocated to customers who call in. Computer software is used to answer telephone calls and direct the calls to the appropriate pool of operators. In this application, the operators are the resources to be allocated. The wait time that a customer experiences is inversely proportional to customer satisfaction and, therefore, it is important to allocate resources in such a manner as to minimize customer wait time and increase customer satisfaction. In this application, customer benefit is the intangible benefit which is sought to be maximized.

In yet another example, the resources to be allocated are general purpose computers used to solve computationally intensive problems. In this environment, multiple computers can be used concurrently to solve a problem faster than a single computer can solve it. The computers would be connected in a network which may include the Internet. It has even been proposed that personal computers connected to the Internet might constitute resources that could be employed in solving such problems. It is anticipated that a market for such services will become standardized to some extent, so that the computer cycles become a commodity (resource) available from multiple vendors.

SUMMARY OF THE INVENTION

It is therefore an object of the present invention to provide a method for resource allocation given full information regarding future requirements.

It is another object of the invention to provide a method for resource allocation to achieve close to the greatest possible benefit based on the assumption that benefit is proportional to the utilization of resources.

A method of resource allocation is based on a minimum-cost network flow problem, which can be solved in polynomial time. In the practice of the invention, the resource allocation problem is modeled mathematically. In the model, time is divided into intervals. For the Web server farm problem, the assumption is made that each site's demand is uniformly spread throughout each such interval. Server allocations remain fixed for the duration of a fixed time interval. It is also assumed that servers are reallocated only at the beginning of an interval, and that a reallocated server is unavailable for the length of the interval during which it is reallocated. This represents the time to "scrub" the old site (customer data) to which the server was allocated, to reboot the server and to load the new site to which the server has been allocated. The length of the time interval is set to be equal to the non-negligible amount of time required for a server to prepare to serve a new customer. In current technology, this time is in the order of 5 or 10 minutes.

Each server has a rate of requests it can serve in a time interval. For simplicity, all rates are assumed to be identical. Due to practical concerns (mainly security constraints placed by customers), sharing of servers at the same time is not allowed. That is, customers share servers only in the sense of using the same servers at different times, but do not use the same servers at the same time. Thus, even in case of overload, some of the servers may be underutilized if they are allocated to sites with rates of requests lower than the servers' rate.

Each customer's demand is assumed to be associated with a benefit gained by the service provider in case a unit demand is satisfied. Given a fixed number of servers, the objective of the service provider is to find a time-varying server allocation that would yield benefit gained by satisfying sites' demand. Since in the problem solved by the present invention future demand of the sites is known, a polynomial time algorithm is used to compute the optimal offline allocation.

Interestingly, the model can be cast as a more general benefit task system. In this task system, we are given a set of states for each time, t, and a benefit function. The system can be at a single state at each time, and the benefit for time t is a function of the system states at times t−1 and t. The goal is to find a time varying sequence of states that yields benefit. That is, at each time t, we need to determine to which state should the system move (and this will be the state of the system at time t+1), and we gain the benefit that is determined by the benefit function. Similar to the server farm model, the benefit function is known in advance.

It can be shown that benefit task systems capture also benefit maximization variants of well studied problems, such as the k-server problem (see A. Borodin and R. El-Yaniv in *On-Line Computation and Competitive Analysis,* Cambridge University Press, 1998) and metrical task systems (see *On-Line computation and Competitive Analysis,* cited above). Thus, our results hold for these variants as well, and show that the benefit variants of these problems may be more tractable than their cost minimization variants.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Although the invention is described in terms of a specific application to a Web server farm, this explanation is by way of example only. It will be understood by those skilled in the art that the invention may be applied to other applications. Among those applications are the customer telephone support problem and the allocation of computers to computationally intensive problems already mentioned. The Web server farm problem will serve to provide a concrete application of the invention which can be applied to other resource allocation problems.

Figure 1:
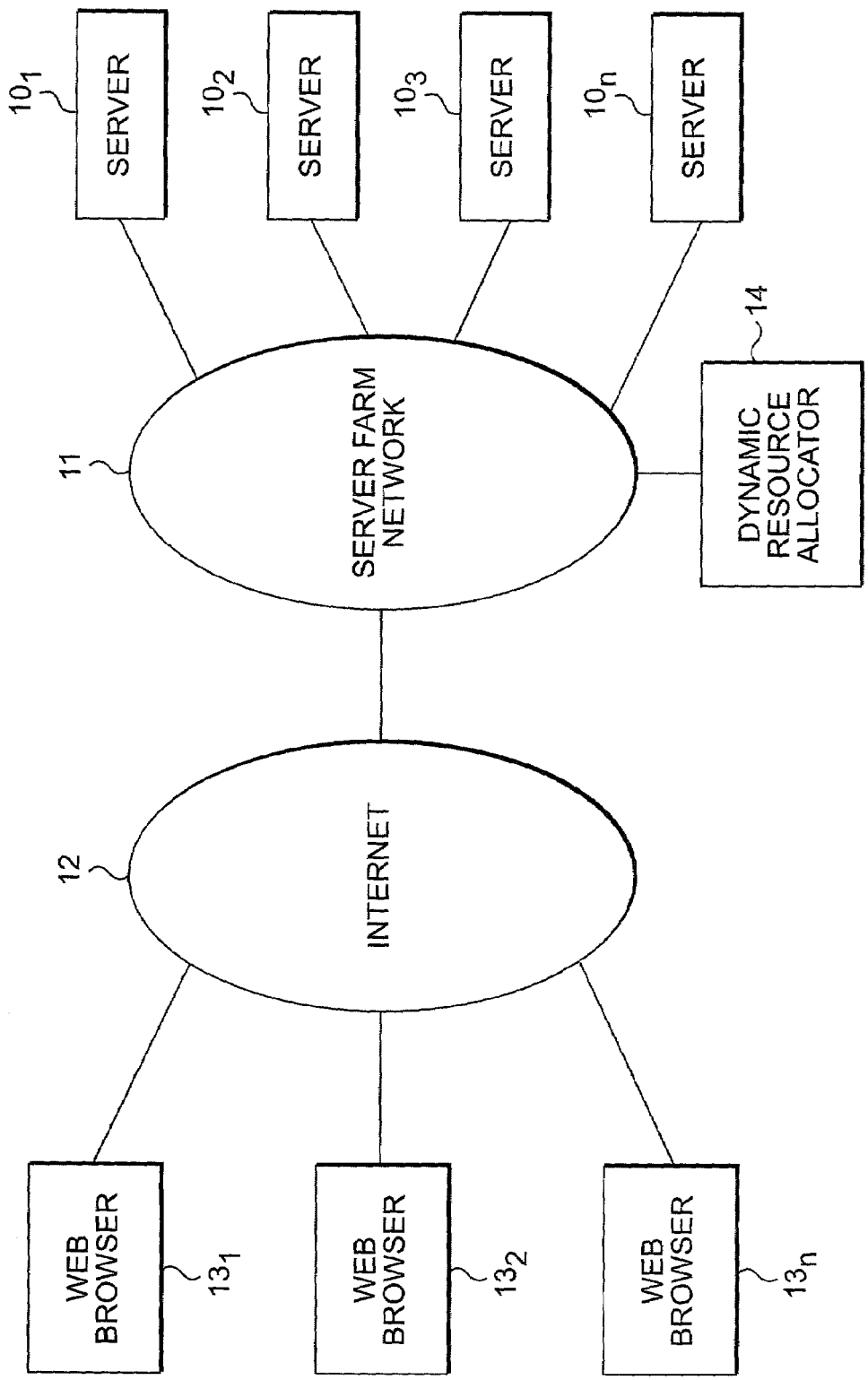
FIG. 1 is a block diagram illustrating the architecture of a Web server farm.

Referring now to the drawings, and more particularly to FIG. 1, there is shown, in generalized form, the architecture of a Web server farm of the type managed and maintained by a Web hosting service provider. The farm itself comprises a plurality of servers $10_1$, $10_2$, $10_3$, ..., $10_n$ connected to a server farm network 11. The server farm network 11 connects the servers via the Internet 12 to a plurality of Web browsers $13_1$, $13_2$, ..., $13_n$. Customers of the Web hosting service provider purchase hosting services, which include maintaining the customers' Web sites so that the Web sites can be readily accessed by persons using the Web browsers. The Web hosting service provider seeks to collect profits by allocation of resources, i.e., the servers. This is the function of the dynamic resource allocator 14 connected to the server farm network.

Figure 2:
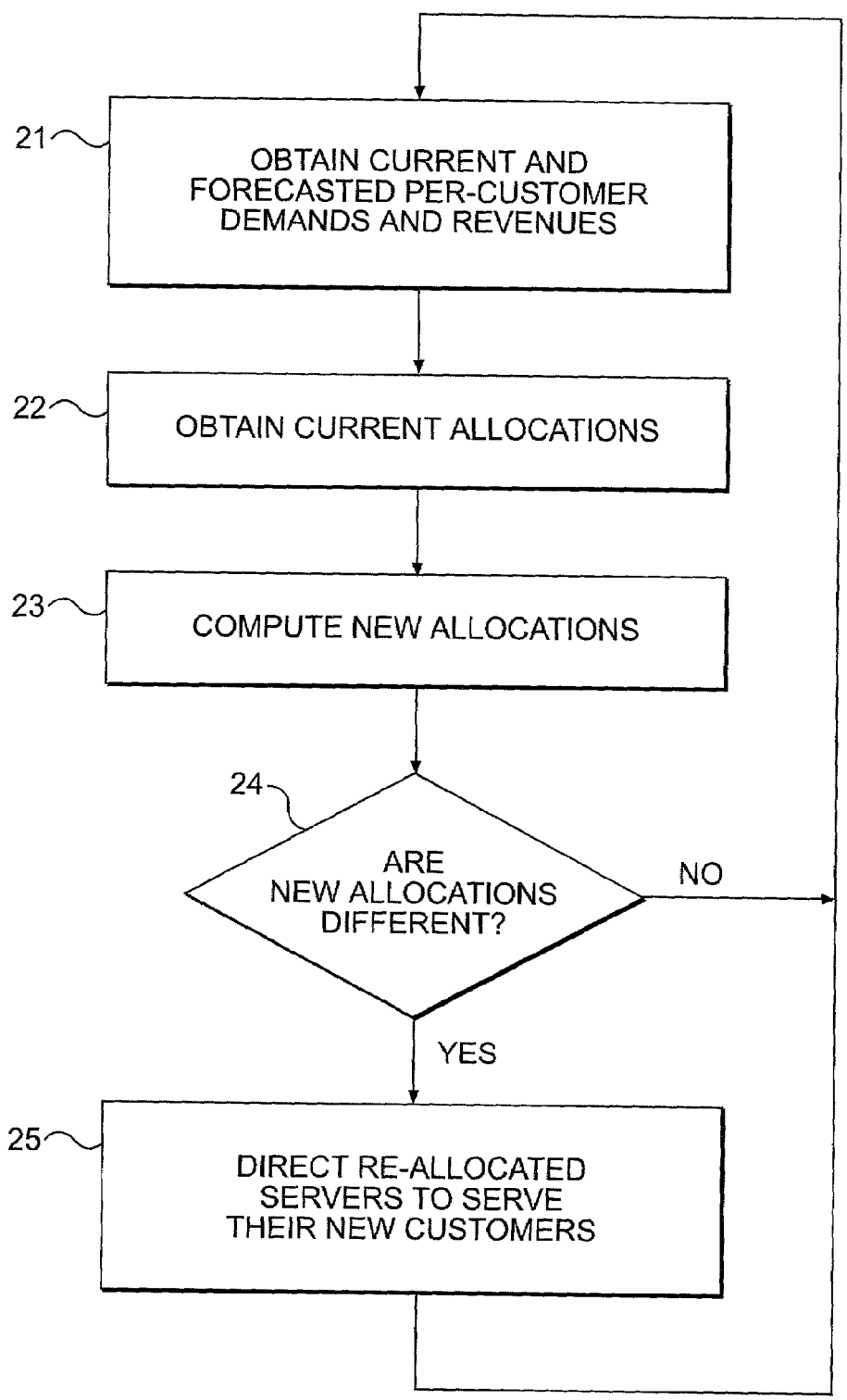
FIG. 2 is a flow diagram illustrating the process of allocating servers using projected future benefits.

FIG. 2 illustrates the general process implemented by the dynamic resource allocator 14. The process begins in function block 21 where the current and forecasted per-customer demands and revenues are obtained. Next, current allocations of servers are obtained in function block 22, and then new allocations are computed in function block 23. The computed new allocations are compared with the current allocations in decision block 24 and, if they are different, then in function block 25, re-allocated servers are directed to serve their new customers before the process loops back to function block 21. If the new allocations are not different from the current allocations, as determined in decision block 24, the process goes directly to function block 21 to begin the process anew.

The first function block 21, obtain current and forecasted per-customer demands and revenues, is outside the scope of the present invention. We assume some forecasting mechanism is used to determine the projected demands and benefits. As will be explained in more detail, the present invention is the algorithm for deciding what the allocations should be based on a given forecast; i.e., function block 23, compute new allocations. Allocations are made based on the result of this computation.

The Web Server Farm Problem

Suppose that we are given s Web sites that are to be served by k Web servers. (For simplicity, we assume that all servers are identical.) Time is divided into units. It is assumed that the demand of a Web site is uniform in each time unit. Each server has a "service rate" which is the number of requests to a Web site each server can serve in a time unit. Without loss of generality, we normalize the demands by the service rate so that a server can serve one request per time unit and demands of a site may be fractional. A Web server can be allocated to no more than one site at each time unit and it takes a time unit to change the allocation of a server.

A problem instance consists of the number of servers, k, the number of sites, s, a non-negative benefit matrix, $b_{i,t}$, denoting the benefit gained by serving a request of site i∈ [1 ... s] for time step t≧1, and a non-negative demand matrix, $\{d_{i,t}\}$, denoting the number of requests at site i for time step t. The goal is to find for each site i∈[1 ... s] a time varying allocation $\{a_{i,t}\}$ of servers, so as to collect benefit, as follows. The allocation must satisfy that for each $$\sum_{i=1}^{s} a_{i,t} \leq k. \text{ Only } a'_{i,t} = \min\{a_{i,t-1}, a_{i,t}\}$$

of the servers allocated to site i for the time step t are "productive", i.e., actually serve requests. We get that the total benefit of an allocation $\{a_{i,t}\}$ is $$\sum_{t\geq 1}\sum_{i=1}^{s} b_{i,t} \cdot \min\{d_{i,t}, a'_{i,t}\} + \sum_{t\geq 1}\sum_{i=1}^{s} b_{i,t} \cdot \min\{d_{i,t}, a_{i,t}, a_{i,t-1}\}.$$

In the offline solution of this problem according to the present invention, we are given the complete demand matrix, $\{d_{i,t}\}$, and we need to compute the complete allocation $\{a_{i,t}\}$.

The Benefit Task System Problem

The Web server farm problem is a special case of the generalized task system benefit problem. In this problem, we are given (i) a set of possible states $U_t$, for each time t≧0, and (ii) a non-negative benefit function B whose domain is $\cup_t(U_t \times U_{t+1})$, that denotes, for each time t≧0, the benefit that is accrued (at time t+1) by the transition from a state $U_t$ to a state $U_{t+1}$. The goal is to choose a state $s_t$ for each time t so as to collect benefit $$\sum_t B(s_t, s_{t+1}).$$

In the offline version of the problem, all the state sets and the benefit function are known in advance.

Observe that the Web server farm problem can be cast in this setting by identifying each possible allocation of servers to sites at time t with a state $S_{i,t}$, and defining the benefit function $B(S_{i,t}, S_{j,t+1})$ to be the benefit gained by changing the allocation at time t from the one represented by $S_{i,t}$ to the allocation at time t+1 represented by $S_{j,t+1}$, (In a sense, the set of states for all times is the same.) The number of states is exponential in the number of servers k, so the states and the benefit functions are implicit and follow from the more succinct representation of the Web server farm problem. For example, the values $B(s_{i,t}, s_{j,t+1})$ are not listed explicitly, and any single value can be efficiently computed when necessary.

An Offline Algorithm for the Server Farm Problem

The offline Web server farm problem can be solved in polynomial-time. We reduce the Web server farm problem to the well-known minimum-cost network flow problem, which can be solved in polynomial time. See, for example, R. K. Ahuja, T. L. Magnanti and J. B. Orlin, *Network Flows: Theory, Algorithms, and Applications*, Prentice Hall, 1993, and W. J. Cook, W. H. Cunningham, W. R. Pulleyblank, and A. Schriijver, *Combinational Optimization*, John Wiley & Sons Inc., New York, 1998. The following theorem states this result.

Theorem 1. The offline Web server problem can be reduced in polynomial time to a minimum-cost network flow problem. Hence, it can be solved in polynomial time.

Proof. Recall that the input for the minimum cost network flow problem is a directed network, two special vertices called the source vertex and the sink vertex, an amount of flow to be injected to the source vertex, and a non-negative capacity and a cost for each edge. The goal is to find from all the flows from s to t that respect the edge capacities and are of size k, one that has a minimal cost, where the cost of a flow is the sum, over all edges, of the product of the flow on the edge and its cost.

In fact, we describe below a reduction from the Web server farm problem to the analogous maximum-cost network flow problem. The latter problem is essentially the same as the minimum-cost network flow problem (and thus can be solved in polynomial time), since the edge costs are not restricted in sign, i.e., they are allowed to be negative. We remark that in our network, all the paths from s to t are of equal length, and therefore another way to guarantee that all costs are non-negative is to increase the costs of all the edges by the same sufficiently large number.

Figure 3:
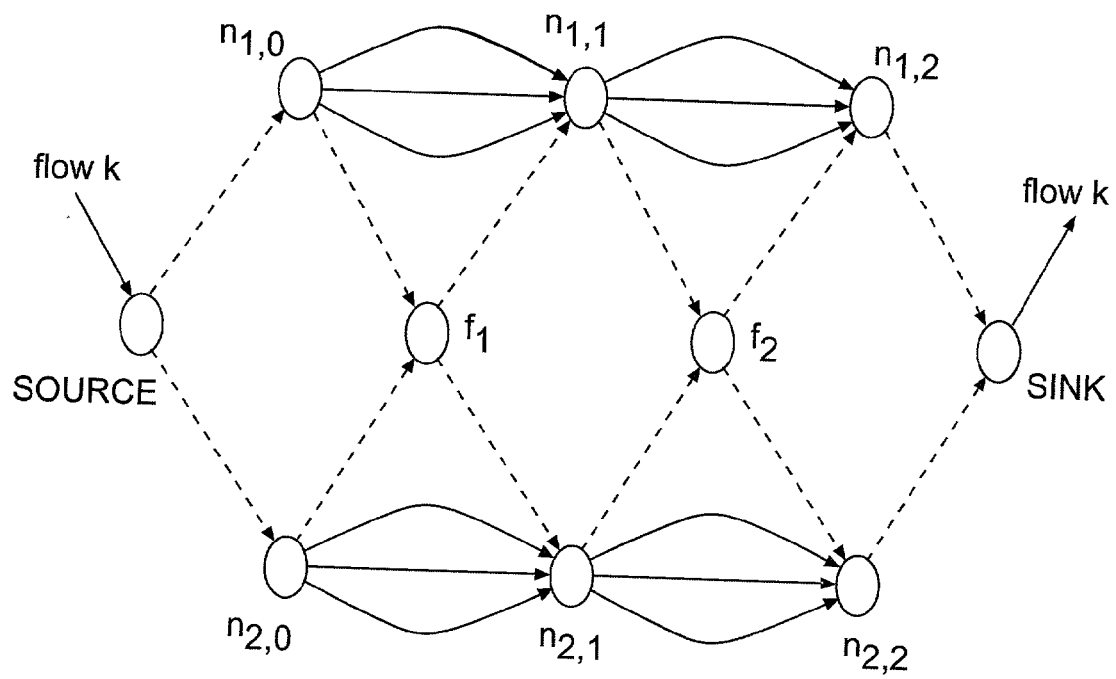
FIG. 3 is a network flow graph showing the special case of two customers and two time steps.

The outline of the reduction is illustrated in FIG. 3. Given the instance of the Web server farm problem, we construct a (directed) network with s "rails", one per site. Each rail is a chain of edges each representing one time step. (Actually, we will split these edges into three parallel edges, for reasons which will become clear shortly.) Flow along a rail represents the allocation of servers to the corresponding site. In addition, we construct a set of "free pool" nodes, one per time step, through which flow will pass when servers are reallocated from one site to another.

Figure 4:
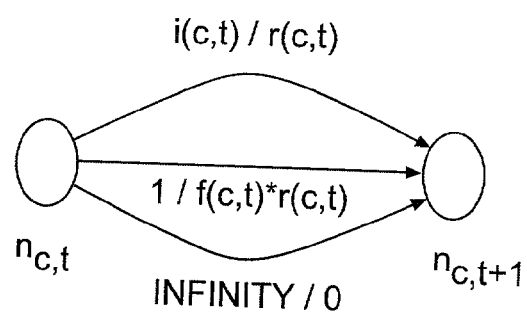
FIG. 4 is a detail illustrating the edges corresponding to a single customer for a single time step.

Let $d_{i,t}$, $1 \leq i \leq s$, $1 \leq t \leq T$, be the demand matrix. We construct nodes $n_{i,t}$, $1 \leq i \leq s$, $0 \leq t \leq T$, along with nodes $f_t$, $1 \leq t \leq T$. As best shown in FIG. 4, for each site s and each time step t, we construct three edges from $n_{i,t-1}$ to $n_{i,t}$. The first has capacity $\lfloor d_{i,t} \rfloor$ and cost $r_{i,t}$. The second has capacity one and cost $r_{i,t} \cdot (d_{i,t} - \lfloor d_{i,t} \rfloor)$. The last has infinite capacity and cost zero. Flow along the first edge represents the benefit of allocating servers to site i during time step t, up to the integer part of $d_{i,t}$. Flow along the second represents the remaining benefit, $r_{i,t}$, times the fractional part of $d_{i,t}$ to be collected by one more server (that will be only partially productive). Flow along the third represents the fact that extra servers can remain allocated to s but do not collect any benefit. Clearly, the first edge will saturate before flow is present on the second, and similarly, the second will saturate before flow is present on the third.

We also construct edges of infinite capacity and cost zero from $n_{i,t-1}$ to $f_t$ and from $f_t$ to $n_{i,t}$, for each $1 \leq t \leq T$ and each $1 \leq i \leq s$. These represent the movement of servers from one site to another. (We use an intermediate node $f_t$ to keep the number of edges linear.)

Finally, we construct a source into which we inject flow k, with infinite capacity zero cost edges to each $n_{i,0}$, and a sink with infinite capacity zero cost edges from each $n_{i,T}$.

It is not hard to see that an integral flow of cost C in this network corresponds to an allocation $\{a_{i,t}\}$ with benefit equal to C, and vice versa. It is well known that since all the edge capacities are integral, there is minimum-cost (or maximum-cost) flow in the network that is integral, and that, furthermore, such a flow can be efficiently found. This implies an efficient algorithm that finds the optimal allocation $\{a_{i,t}\}$. Note that the size of the network is linear in the size of the input for the Web server farm problem (i.e., the size of the demands matrix $\{d_{i,t}\}$), and thus the running time is the same as that of the best algorithm for minimum-cost network flow.

Figure 5:
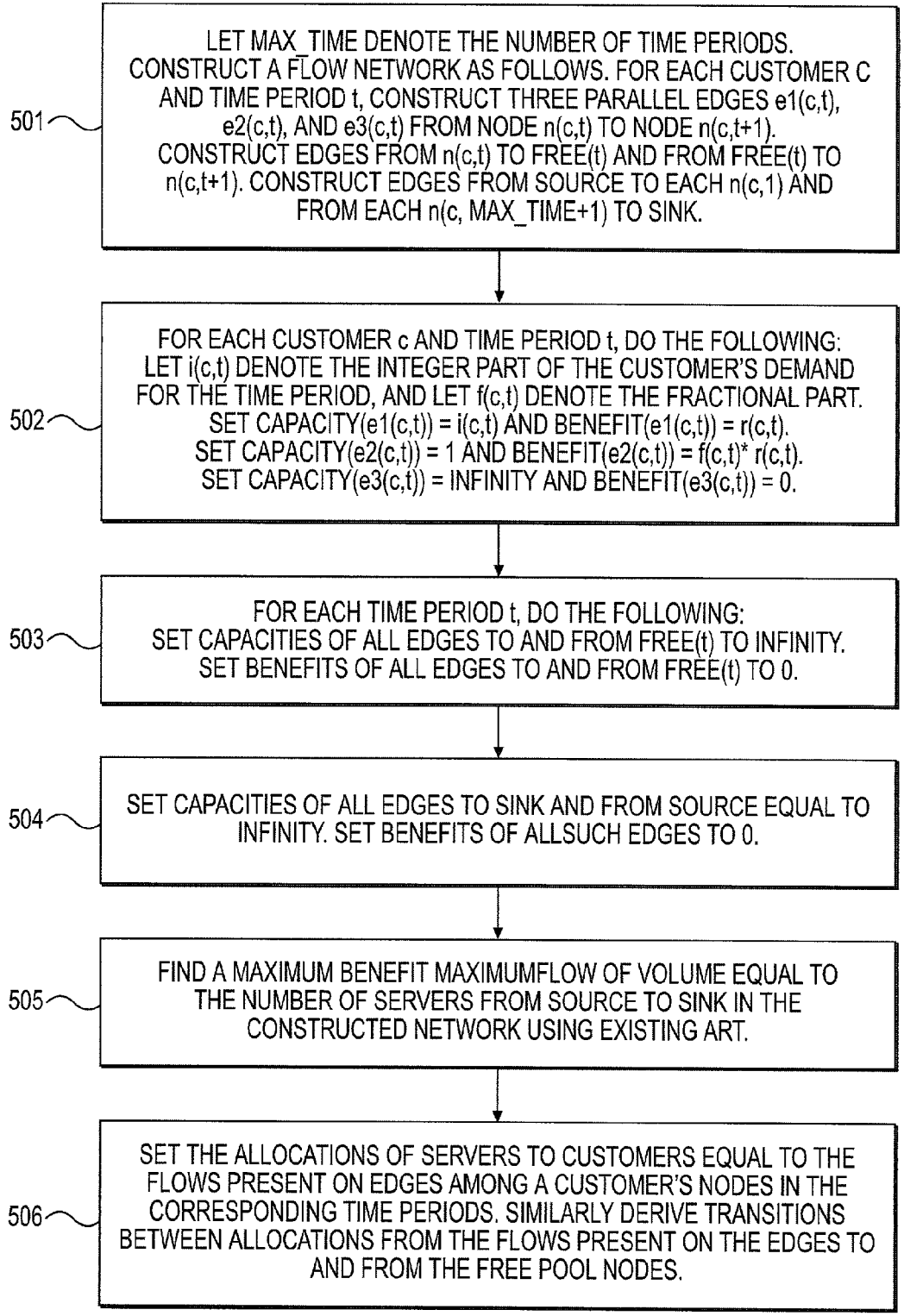
FIG. 5 is a flow diagram illustrating the process of computing new allocations of servers.

Returning now to the drawings, the computation of new allocations (function block 23 in FIG. 2) is shown in FIG. 5. The process begins with an initialization step in function block 501. In this step max_time is set to denote the number of time periods. The flow network is constructed so that, for each customer c and time period t, three parallel edges e1(c, t), e2(c, t) and e3(c, t) are constructed from node n(c, t) to node n(c, t+1). In addition, edges from n(c, t) to free(t) and from free(t) to n(c, t+1) and edges from the source node n(c, 1) to each node n(c, max_time+1) to the sink are constructed. Next, in function block 502 the following is done for each customer c. Let II denote the integer part of the customer's demand for the time period, and let F denote the fractional part. Set capacity(e1(c, t))=1 and benefit(e1(c, t))=R(c, t); set capacity (e2(c, t))=1 and benefit(e2(c, t))=F×R(c, t); and set capacity (e3(c, t))=∞ and benefit(e3(c, t))=0. Then, in function block 503 the following is done for each time period t. The capacities of all edges to and from free(t) are set to infinity, and the benefits of all edges to and from free(t) are set to zero. Next, in function block 504, the capacities of all edges to the sink and from the source are set to the number of servers. The benefits of all such edges are set to zero. Now, in function block 505, the maximum benefit flow of volume equal to the number of servers is found from the source to the sink in the constructed network. This calculation is performed according to known methods. Finally, in function block 506, the allocations of servers to customers is set equal to the flows present on edges among a customer's nodes in the corresponding time periods.

Similarly, the transitions between allocations from the flows present on the edges to and from the free pool nodes are derived.

While the invention has been described in terms of a preferred embodiment, those skilled in the art will recognize that the invention can be practiced with modification within the spirit and scope of the appended claims.

The invention claimed is:

1. A method for server allocation in a Web server "farm" based on information regarding future loads to achieve close to greatest possible revenue based on an assumption that revenue is proportional to the utilization of servers and differentiated by customer comprising the steps of:

modeling a server allocation problem mathematically;

in the model, dividing time into intervals based on an assumption that a site's demand is uniformly spread throughout each such interval;

maintaining server allocations fixed for the duration of an interval, servers being reallocated only at the beginning of an interval, and a reallocated server being unavailable for the length of the interval during which it is reallocated providing time to "scrub" an old site (customer data) to which the server was allocated, to reboot the server and to load the new site to which the server has been allocated, each server having a rate of requests it can serve in a time interval and customers share servers only in the sense of using the same servers at different times, but do not use the same servers at the same time;

associating each customer's demand with a benefit gained by a service provider in case a unit demand is satisfied and finding a time-varying server allocation that would maximized benefit gained by satisfying sites' demand; and reducing to a minimum-cost network flow problem and solving in polynomial time.

2. A method of resource allocation to yield a benefit comprising the steps of:

choosing a state $s_t$ for each time t so as yield a benefit where all state sets and a benefit function are known in advance;

reducing a problem to an analogous maximum-cost network flow problem by constructing a directed network with s "rails", one per site, each rail being a chain of edges each representing one time step, flow along a rail representing an allocation of resources to a corresponding site, constructing a set of "free pool" nodes, one per time step, through which flow will pass when resources are reallocated from one site to another, for a demand matrix $d_{i,t}$, $1 \leq i \leq s$, $1 \leq t \leq T$, constructing nodes $n_{i,t}$, $1 \leq i \leq s$, $0 \leq t \leq T$, along with nodes $f_t$, $1 \leq t \leq T$, and for each site s and each time step t, constructing three edges from $n_{i,t-1}$ to $n_{i,t}$, wherein the first edge has capacity $\lfloor d_{i,t} \rfloor$ and cost $r_{i,t}$, the second edge has capacity one and cost $r_{i,t} \cdot (d_{i,t} - \lfloor d_{i,t} \rfloor)$, and the third edge has infinite capacity and cost zero, flow along the first edge representing a benefit of allocating resources s to site i during time step t, up to the integer part of $d_{i,t}$, flow along the second edge representing a remaining benefit, $r_{i,t}$, times a fractional part of $d_{i,t}$ to be collected by one more resource, and flow along the third edge representing that extra resources can remain allocated to s but do not collect any benefit, constructing edges of infinite capacity and cost zero from $n_{i,t-1}$ to $f_t$ and from $f_t$ to $n_{i,t}$, for each $1 \leq t \leq T$ and each $1 \leq i \leq s$ which represent a movement of servers from one site to another, constructing a source into which a flow k is injected, with infinite capacity zero cost edges to each $n_{i,0}$, and a sink with infinite capacity zero cost edges from each $n_{i,T}$; and solving the maximum-cost network flow problem and allocating resources.

3. The method of resource allocation as recited in claim 2, wherein resource allocation is done to maximize a benefit.

4. The method of resource allocation as recited in claim 2, wherein the benefit is a tangible benefit.

5. The method of resource allocation as recited in claim 4, wherein the tangible benefit is a profit and resource allocation is done to maximize the profit.

6. The method of resource allocation as recited in claim 2, wherein the benefit is an intangible benefit.

7. The method of resource allocation as recited in claim 6, wherein the intangible benefit is customer satisfaction and resource allocation is done to maximize customer satisfaction.

8. The method of resource allocation as recited in claim 2, wherein the resource is computer cycles and resource allocation is done to more efficiently solve computationally intensive problems.

* * * * *